(12) United States Patent
Pathak et al.

(10) Patent No.: US 11,562,191 B1
(45) Date of Patent: Jan. 24, 2023

(54) TRACKING, MONITORING, AND CONSOLIDATING TRANSACTIONS USING QUICK RESPONSE CODES

(71) Applicant: PayPal, Inc., San Jose, CA (US)

(72) Inventors: Sunil Kishor Pathak, Cupertino, CA (US); Venkatesan Dasarathan, Fremont, CA (US); Sreevarshini Kuppuraj, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/386,394

(22) Filed: Jul. 27, 2021

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01)

(58) Field of Classification Search
CPC .. G06K 7/1404; G06K 7/1413; G06K 7/1417; G06K 19/00; G06K 19/06018; G06K 19/06028; G06K 19/06037
See application file for complete search history.

(56) References Cited

U.S. PATENT DOCUMENTS

| 2018/0225666 A1* | 8/2018 | Khan | G06Q 20/405 |
| 2019/0164161 A1* | 5/2019 | Sultan | G06Q 20/4012 |
| 2019/0370846 A1* | 12/2019 | Zha | G06Q 30/02 |

* cited by examiner

*Primary Examiner* — Laura A Gudorf
(74) *Attorney, Agent, or Firm* — Haynes & Boone, LLP (57) ABSTRACT

Systems and methods for using QR codes to track, monitor, and consolidate transactions are disclosed. In one embodiment, a system may receive a request from a first device to generate a first QR code associated with a first account. The system may generate the first QR code and send the first QR code to the first device. The system may receive a request from the first device to share a QR code with a second device. The system may update associated data to indicate a sharing of a QR code with the second device. The system may generate a second QR code associated with a second account of the second device and linked to the first account, so that use of the second QR code can be tracked and monitored. The system may send the second QR code to the second device.

20 Claims, 9 Drawing Sheets

TRACKING, MONITORING, AND CONSOLIDATING TRANSACTIONS USING QUICK RESPONSE CODES

TECHNICAL FIELD

The present disclosure generally relates to digital transactions and more particularly to using quick response (QR) codes to track, monitor, and consolidate digital transaction information according to various embodiments.

BACKGROUND

QR or quick response codes continue to expand in their uses, due in part to their ability to hold more information and/or be able to be displayed within a smaller area than conventional barcodes. One such use is for entry to various types of events, including sporting events, concerts, and trade shows. Typically, the QR code is only used for entry to the event (i.e., functioning as a ticket) and is no longer used for other purposes associated with the event. However, there may be many other aspects of an event beyond just entry and attendance/viewing at the event. Events are often organized such that the attendees of the event are able to receive reimbursement for expenses incurred during the event. However, reimbursement processes typically require the attendees to show the expenses incurred and request reimbursement. When there are many attendees at an event, such reimbursement processes are inefficient and inconvenient for both the event organizer and the attendees. In some cases, when the event organizer wants to cover the expenses for the attendees so that there is no post-event reimbursement process, the event organizer often provides coupons, which are not convenient as they are not adjustable after they have been issued, are limited in how the event organizer can restrict their use, and oftentimes are lost or misplaced. Furthermore, conventional reimbursement and coupon processes do not allow for the event organizer to track and monitor transactions during an event, nor do they allow for consolidation of transaction information associated with transactions conducted by attendees of the event such as for event analysis (e.g., real-time event analysis used to make timely adjustments in coordinating the event), statistical reporting, and other desired purposes. Thus, there is a need in the art for systems and methods that allow for efficient and convenient tracking, monitoring, and consolidation of transactions such as for organized events and other uses in both online and offline environments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods for tracking, monitoring, and consolidating transaction information using QR codes. For organized events where the event attendees are able to seek reimbursement for expenses incurred during the event, oftentimes the event organizer and/or the attendees will need to keep track of transactions conducted during the event so that an expense report can be prepared and used for purposes such as reimbursement (e.g., employee reimbursement), record keeping (e.g., for taxes purposes), and so forth. In cases where there are many attendees at an event, reimbursement processes in which the attendees create expense reports and submit them to the event organizer (e.g., the company sponsoring the event) for reimbursement are inefficient and inconvenient for both the event organizer and the attendees. Often these conventional reimbursement processes clutter computer storage as PDFs or images of bills/receipts for each transaction for the attendees must be generated and stored.

Similarly, when the event organizer wants to cover the expenses for attendees of an event so that there is no post-event reimbursement process, the event organizer often provides coupons, which are inconvenient as they are not adjustable after they have been issued, are limited in how the event organizer can restrict their use, and oftentimes are lost or misplaced. Furthermore, conventional reimbursement and coupon processes do not allow for the event organizer to track and monitor transactions in real-time during an event, nor consolidate transaction information associated with transactions conducted by attendees of the event such as for event analysis, statistical reporting, and other desired purposes. Thus, there is a need in the art for systems and methods that allow for efficient and convenient tracking, monitoring, and consolidation of transaction information such as for organized events and other uses in both online and offline environments.

Furthermore, in recent times, contactless solutions are needed for events where there may be a large number of attendees to avoid transmission of submicroscopic infectious agents and microorganisms. Using QR codes according to the embodiments in the present disclosure provides a contactless solution for events to reduce the likelihood of transmission of infectious agents and microorganisms by limiting contact needed for conducting transactions, creating transaction detail reports, and conducting reimbursement processes.

In one embodiment of the present disclosure, a system is provided by which an event organizer can create a QR code linked to a company or personal account for use during an event. The event organizer can share the QR code with event members (e.g., attendees) to use during the event, such as for commute, food and beverage, shopping, entertainment, and other spending categories or transactions approved by the event organizer. The event members may receive a personal QR code in an application on their mobile devices, email, or text. The personal QR code may be linked back to the event organizer's account. The event members may then show the QR code (e.g., by displaying it on their mobile device) to a merchant to conduct a transaction during an event. For example, the QR code may be scanned and used to pay for a rideshare service, a game at a fair, dinner, movie tickets, and other transactions that would qualify as being part of the event.

A transaction amount associated with the QR code shared with event members may be fixed or variable based on the event organizer's plans for the event and may be pre-paid or post-paid to support both online and offline transactions where the QR code is accepted by the merchant. The details of each transaction that is conducted by event members who have received a QR code for the event may be consolidated and made available for viewing by the event organizer in the event organizer's account. Thus, the transactions for an event may be tracked and monitored in real-time. The event organizer may be able to make arrangements and coordinate plans for the event quickly in response to the details of the transactions as they occur in real-time. As one illustration, in a fair event, the event organizer may be able to see that a certain beverage supply is going to run out soon as the frequency by which event members are purchasing the beverage has been increasing. The event organizer may be able to send a message to the attendees who have received a QR code indicating that the beverage may be running out soon and that there are other options available elsewhere. As another illustration, in an event at a remote location, the event organizer may be able to see that the majority of event members have used a rideshare service to attend the event, and therefore the event organizer does not have to make plans for additional parking at the remote location.

Further details and additional embodiments are described below in reference to the accompanying figures.

Figure 1:
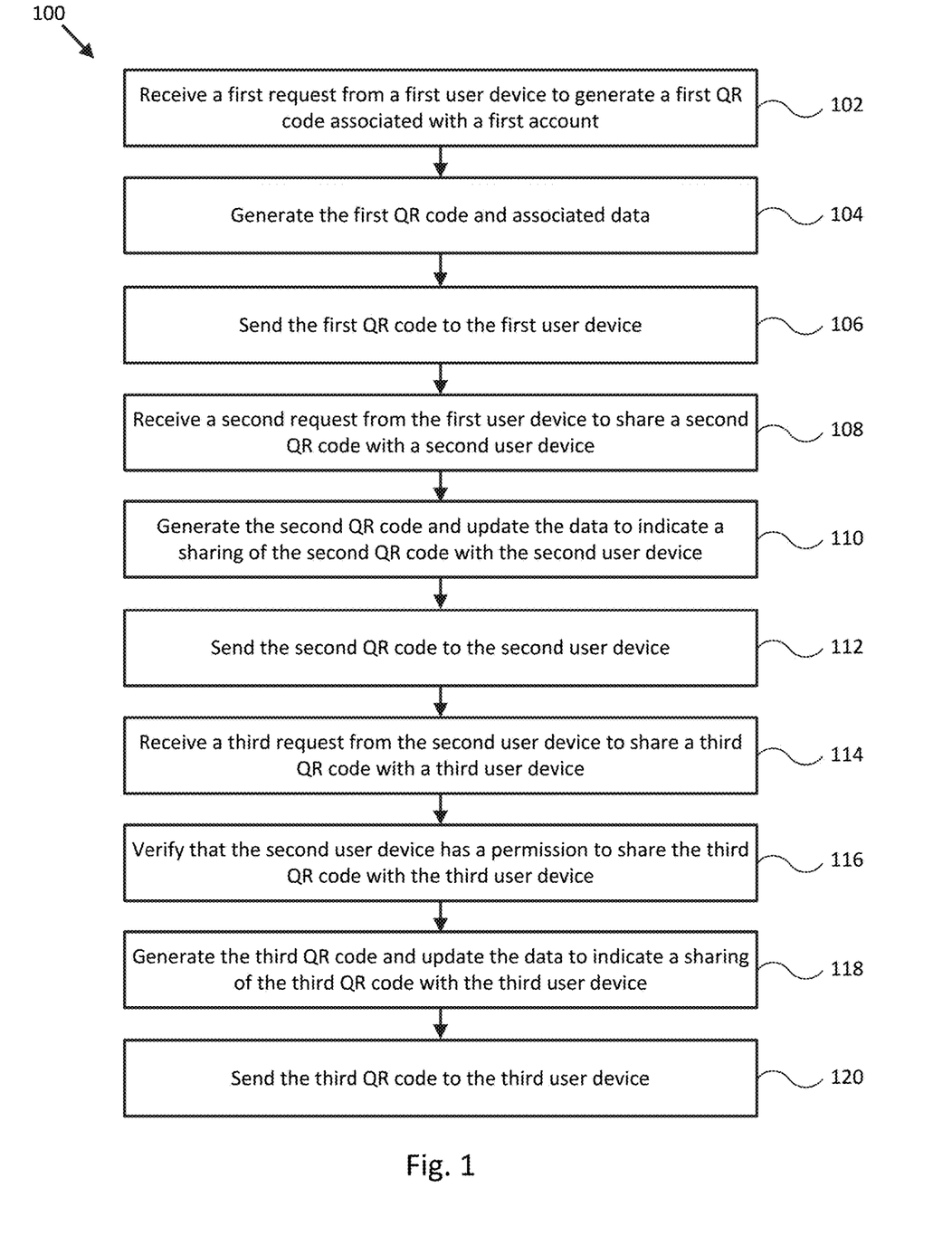
FIG. 1 illustrates a flow diagram of a process for using QR codes to track, monitor, and consolidate transaction information in accordance with one or more embodiments of the present disclosure.

Referring now to FIG. 1, illustrated is a flow diagram of a process 100 for tracking, monitoring, and consolidating transaction information using QR codes in accordance with one or more embodiments of the present disclosure. For explanatory purposes, process 100 is primarily described herein with reference to FIGS. 2-7; however, process 100 is not limited to FIGS. 2-7 and may generally be applied to the additional figures of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed.

It will be appreciated that first, second, third, etc. are generally used herein as identifiers used for explanatory purposes and are not necessarily intended to imply an ordering, sequence, temporal aspect, etc., as can generally be appreciated from the context within which first, second, third, etc. are used.

At block 102, a system receives a first request (e.g., via a network) from a first user device to generate a first QR code associated with a first account of the first user device. The system, for example, may include one or more service provider servers which include non-transitory memory storing instructions and hardware processor(s) capable of reading the instructions to cause the system to perform the operations described in process 100.

Figure 2:
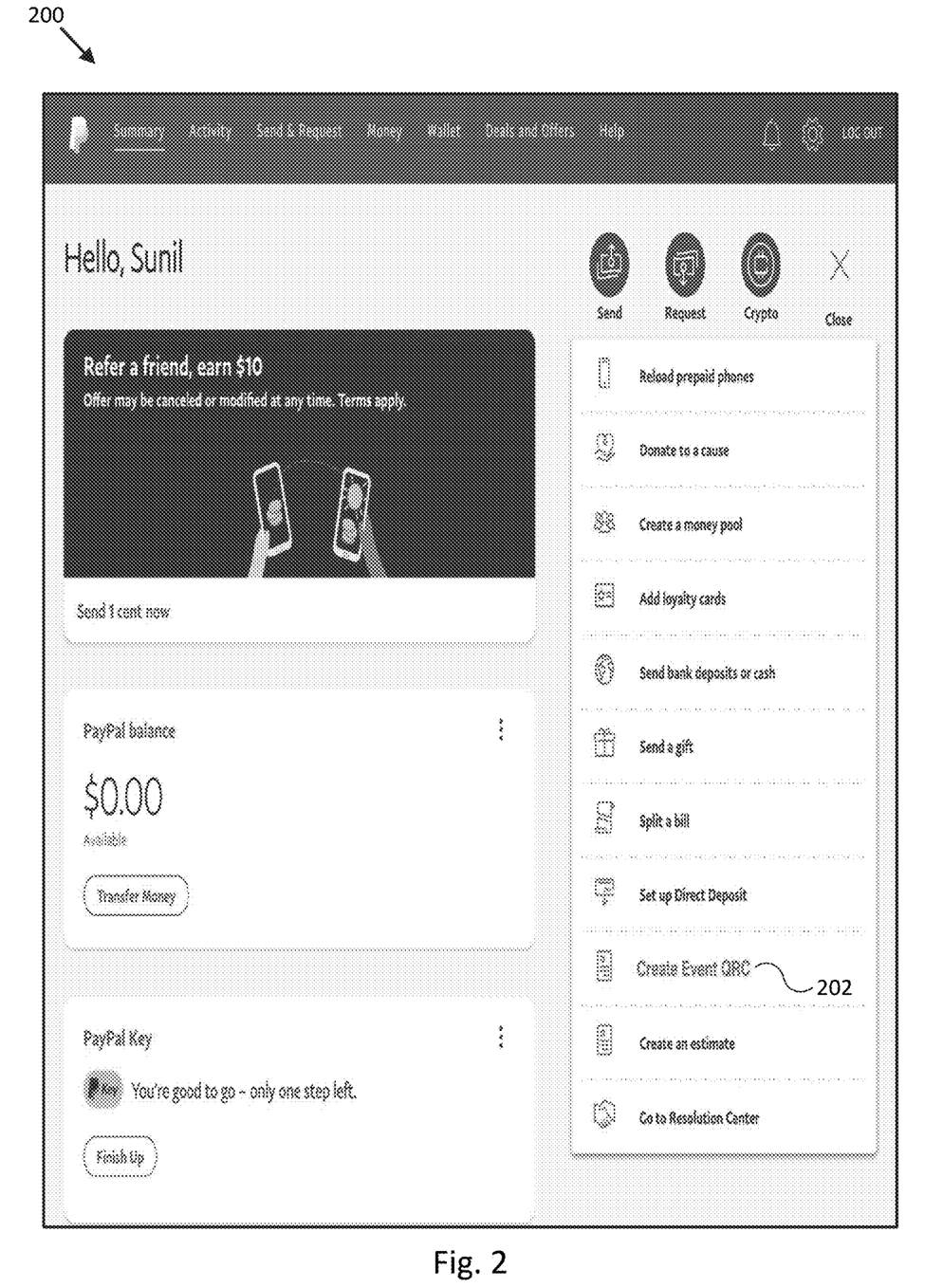
FIGS. 2-6 illustrate various screens in a user interface for an application in accordance with one or more embodiments of the present disclosure.
Figure 3:
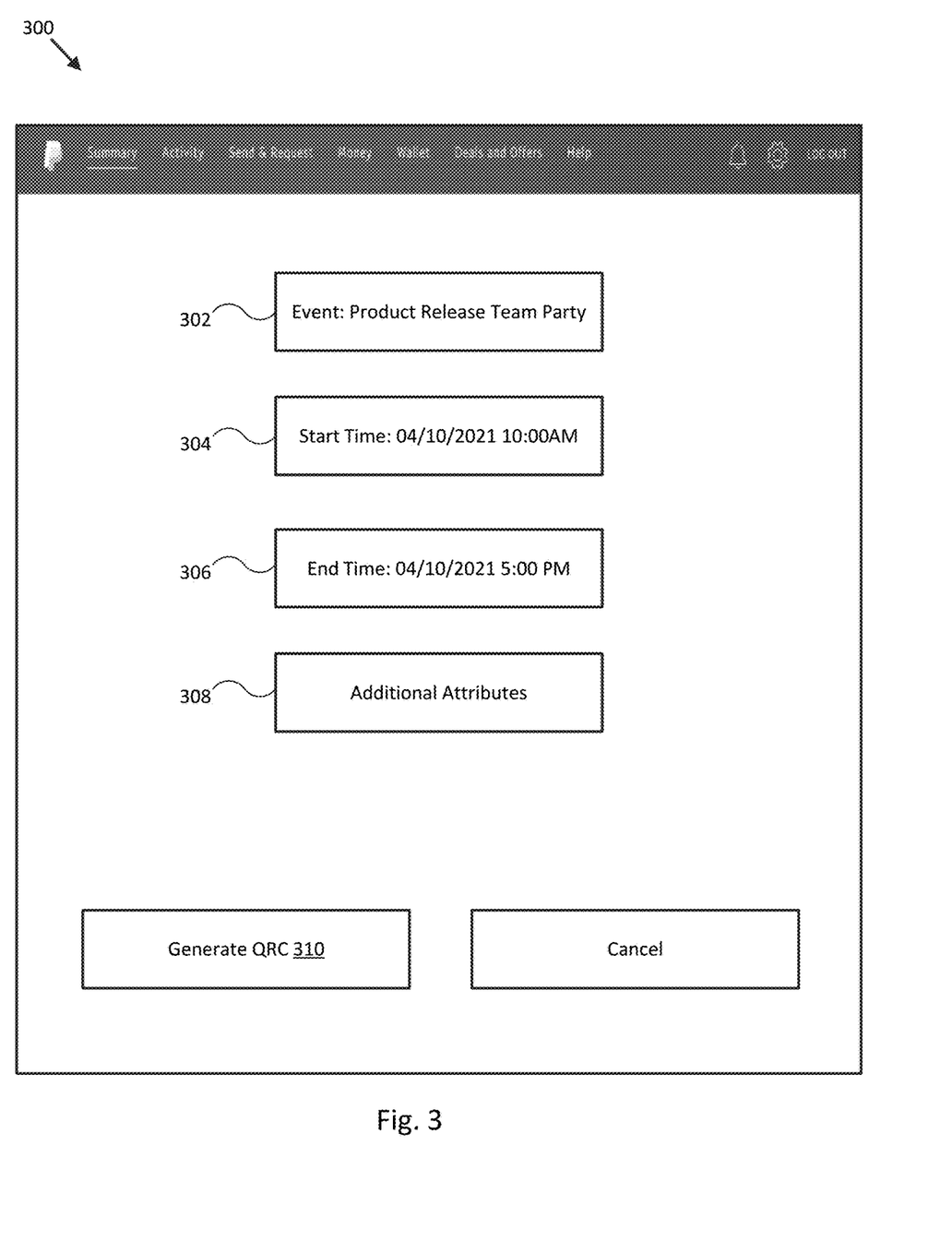

Referring to FIG. 2, a first user associated with the first user device may open an application (e.g., a mobile application, desktop application, web application, etc.) on the first user device and navigate to a screen 200 in a user interface of the application. For example, the screen 200 may be, or may be part of, a home screen in the user interface of the application. As shown in FIG. 2, the screen 200 may include a "Create Event QRC" selectable button/option 202 that the first user may select or interact with to navigate to a screen 300 in the user interface, as shown in FIG. 3. The screen 300 may include fillable fields 302-308 corresponding to desired attributes of the QR code that the first user wants to generate.

For example, the first user may enter a title or description for the first QR code in the field 302. The first user may enter a start date/time and end date/time in fields 304 and 306, respectively, to define a period that the first QR code may be valid for use. In some embodiments, the system may cause the application to auto-populate the event information based on calendar events stored in a calendar application of the first user device. The screen 300 may include additional attribute fields 308 that may be implemented in the user interface of the application to suit a desired application. For example, the additional attribute fields 308 may include a transaction amount spending limit for each user that receives a shared QR code or a total transaction amount spending limit for all users who receive a shared QR code. As another example, the additional attribute fields 308 may include a location designation where shared QR codes may be validly used. In one case, the application may allow the user to draw a geofence for the location or enter a perimeter for the location (e.g., define a radius about a geolocation for a circular perimeter or define certain distances about a geolocation for a rectangular or non-rectangular shape perimeter). As another example, the additional attribute fields 308 may include spending categories (e.g., merchant category codes) for which shared QR codes may be used, such as commute, restaurant/food and beverage, entertainment, retail shopping, grocery shopping, gas, etc. Once the first user has finalized the attribute entry/selection, the first user may select the "Generate QRC" button/option 310 to request that the first QR having the desired attributes be generated and provided to the first user's device. The first request to generate the first QR code may be sent by the first user device to the system (e.g., via a network). The system may receive the first request from the first user device.

Referring back to FIG. 1, at block 104, the system may generate the first QR code and associated data that defines and provides a framework for the first QR code and any additional QR codes that are generated in sharing operations as described herein. The associated data may include the attributes entered/selected by the first user which may control how shared QR codes may be used by other users. The system may link the first QR code to the first account of the first user. For example, the system may identify the first account through a login of the first user into the application in which the first request was made. In some embodiments, the first account of the first user may be a company account used to track, monitor, and consolidate expenses associated with event(s) organized by the first user. In some embodiments, the first account of the first user may be a personal account with a service provider that provides the application used to request generation of the first QR code and/or controls/manages the system that generates the first QR code for the first user.

Figure 7:
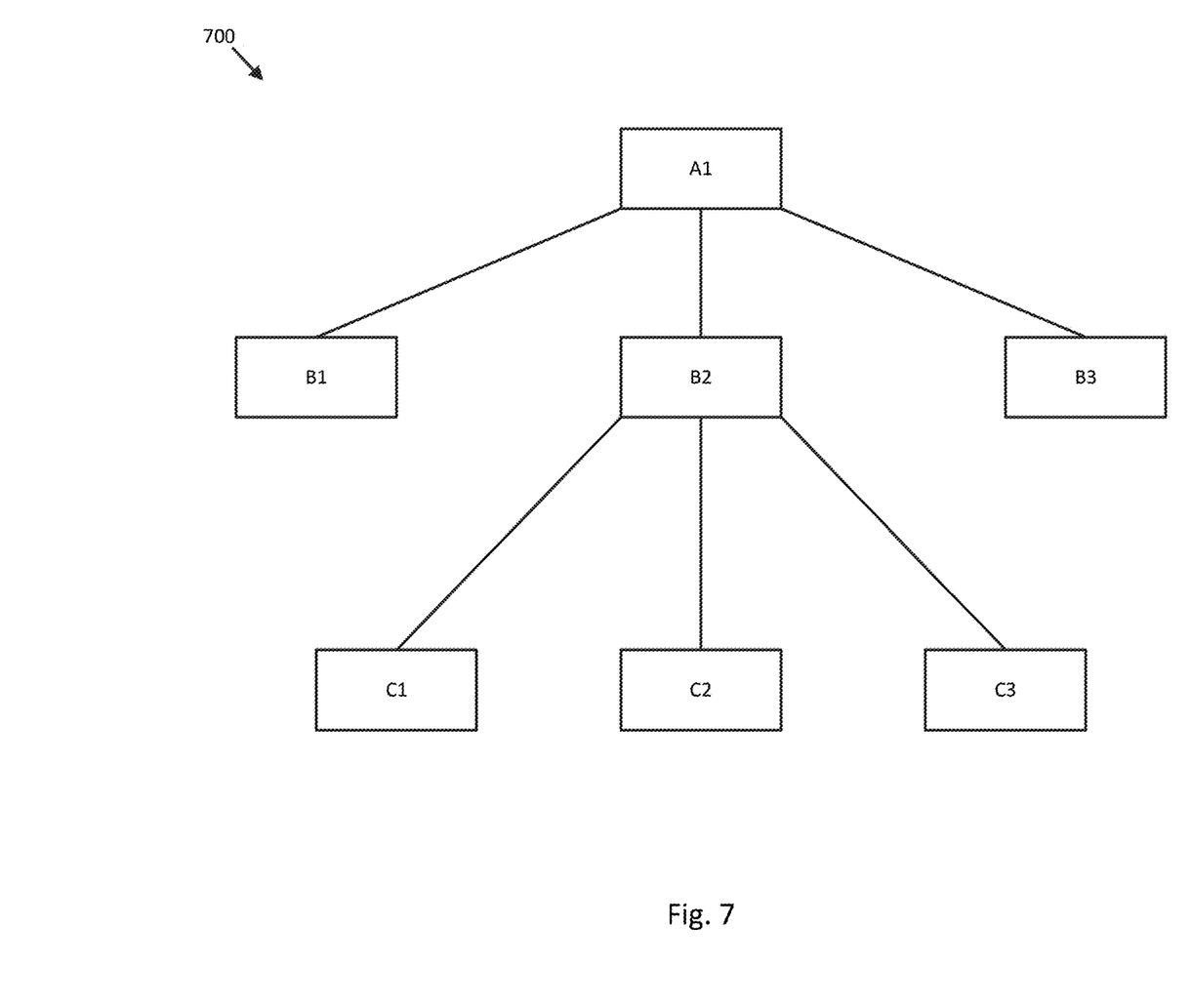
FIG. 7 illustrates a data structure for implementing shareable QR codes in accordance with one or more embodiments of the present disclosure.

As an illustration, referring to the example shown in FIG. 7, the associated data may have a hierarchical parent-child structure 700 that indicates parent accounts and child accounts to which the parent accounts have shared QR codes. The associated data may include QR code permissions and limitations associated with each node (e.g., each parent account and child account) in structure 700. As illustrated in FIG. 7, an account A1 may represent the first user account that originally generated the first QR code for an event. A1 may have shared a QR code with accounts B1-B3. Thus, B1-B3 may be children accounts of A1. Further, B2 may have shared a QR code with accounts C1-C3. Thus, C1-C3 may be children accounts of B2 and grandchildren accounts of A1. For each account in structure 700, associated permissions and limitations in relation to the use of respective QR codes may be stored and referenced when users use their assigned QR code. For example, when a user is conducting a transaction with a merchant during an event, the limitations for an account may be checked and verified before the transaction can be processed for the merchant. In some embodiments a unique QR code may be generated for each recipient of a shared QR code, and the unique QR code may be linked to the recipient's account with the company and/or the service provider (e.g., the QR code may include an account identifier as metadata that is linked to the recipient's account). For example, the system may use the recipient information provided by a sending/sharing user (e.g., at screen 500 in FIG. 5) to identify the account of the recipient with the company and/or service provider (e.g., matching the recipient information to a database storing account identifiers for recipient accounts) and link the account to a uniquely generated QR code that can be provided to the recipient's user device.

In some embodiments, a QR code may be a machine-readable optical label that contains meta information/metadata. In one implementation, a QR code may consist of black squares arranged in a square grid on a white background such that the QR code can be read by an imaging device such as a camera and processed (e.g., using Reed-Solomon error correction) until the image can be interpreted. For example, the imaging device may be part of a merchant device associated with a point-of-sale for the merchant. The merchant device may be able to extract the meta information from the QR code to be provided in a transaction request to the service provider system to conduct a transaction, or the merchant device may provide an image of the QR code to the service provider so that the service provider may extract the meta information in processing the transaction request. The meta information may be extracted from patterns that are present in both horizontal and vertical components of the image. In some embodiments, the QR code meta information may include an identifier (e.g., identifier linked to a user account in structure 700). As an illustration, a unique QR code may be generated for each user with whom a QR code is shared, and each unique QR code may include meta information identifying the user device or account to which the unique QR code is linked. The meta information may be used by the system to store transaction details for each transaction conducted by users in a transaction history for an event. While reference is made primarily to QR codes herein, it will be appreciated that the disclosed concepts may be implemented using other machine-readable codes such as bar codes (e.g., Code 39, Code 128, Interleaved 2 of 5, PDF417, data matrix, etc.) and alphanumeric codes.

Referring back to FIG. 1, at block 106, the system may send the first QR code to the first user device (e.g., via the network). The first user may receive the first QR code in the application on the first user device. In some embodiments, sending the first QR code to the first user device may cause a notification to appear on the first user device (e.g., in the application, as part of the first user device's operating system notifications, etc.) indicating that the first QR code has been received. In other embodiments, the system may coordinate to send an email or text message to notify the first user that he/she has received the first QR code. In some embodiments, the system may send the first QR code in the email or text message so that it may be viewed in an email or text message application on the first user device.

Figure 4:
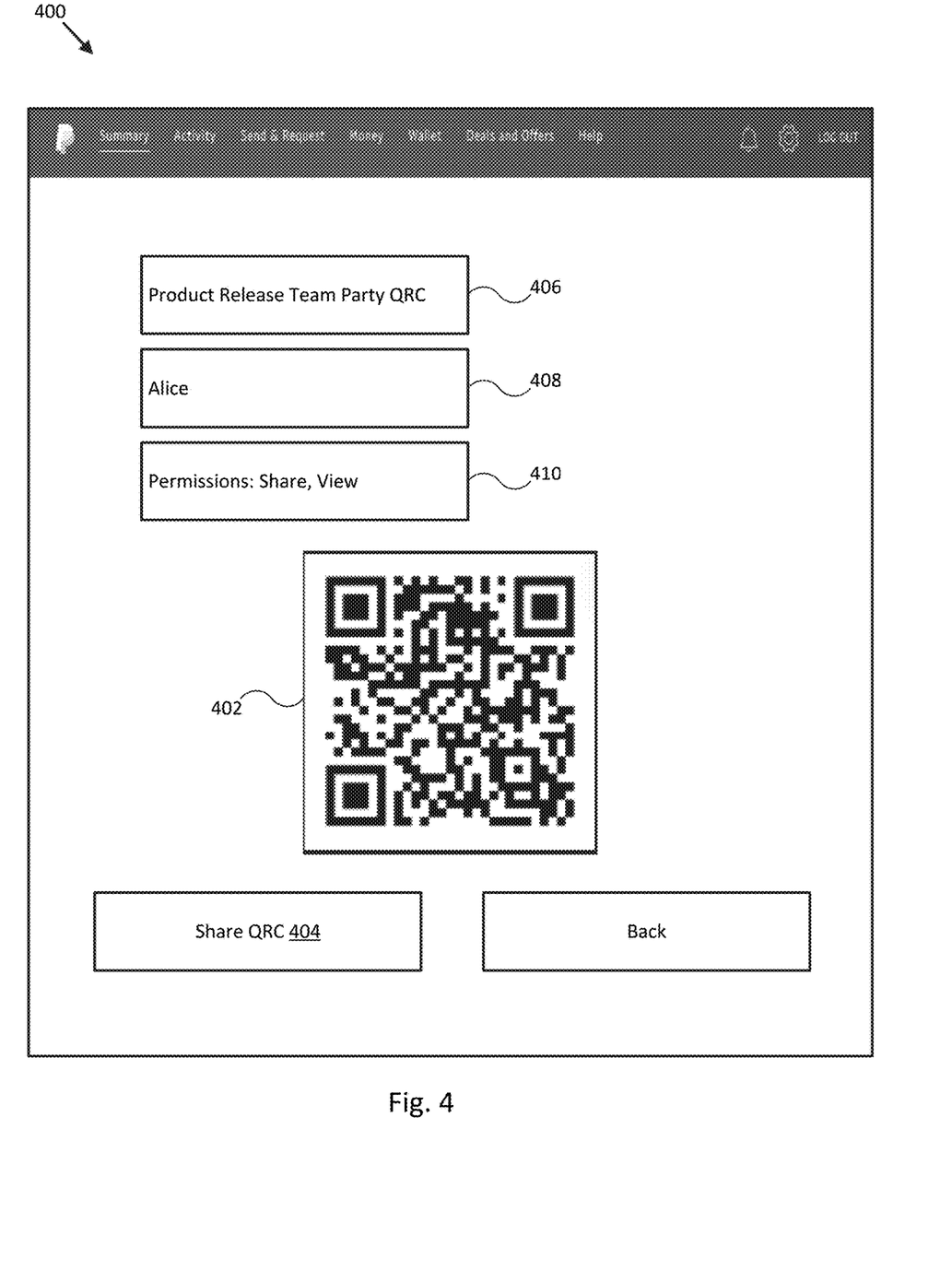

In embodiments where the first user receives the first QR code in the application, referring to FIG. 4, the first user may be able to access a screen 400 in the user interface of the application on the first user device to view the received QR code 402 (e.g., the first QR code). The screen 400 may include a title/description 406 of the QR code 402. The screen 400 may further include information 408 regarding the account holder corresponding to the received QR code 402 (in this case, the first user). The screen 400 may include the permissions 410 that the first user has in relation to the received QR code 402. For example, since the first user is the original generator of the first QR code, the first user may be provided with full permissions in relation to the first QR code, such as viewing permissions, sharing permissions, canceling the first QR code and/or other QR codes, adjusting/editing permissions of other users (e.g., revoking, changing permissions), adjusting/editing limitations on use for others who have received shared QR codes, etc. By non-limiting example, the screen 400 shows the permissions 410 as including a permission to share a QR code with additional users (e.g., one or more other user devices) and a permission to view the received QR code 402. The view permission may be a default permission for each user who has received a shared QR code according to some embodiments.

Figure 5:
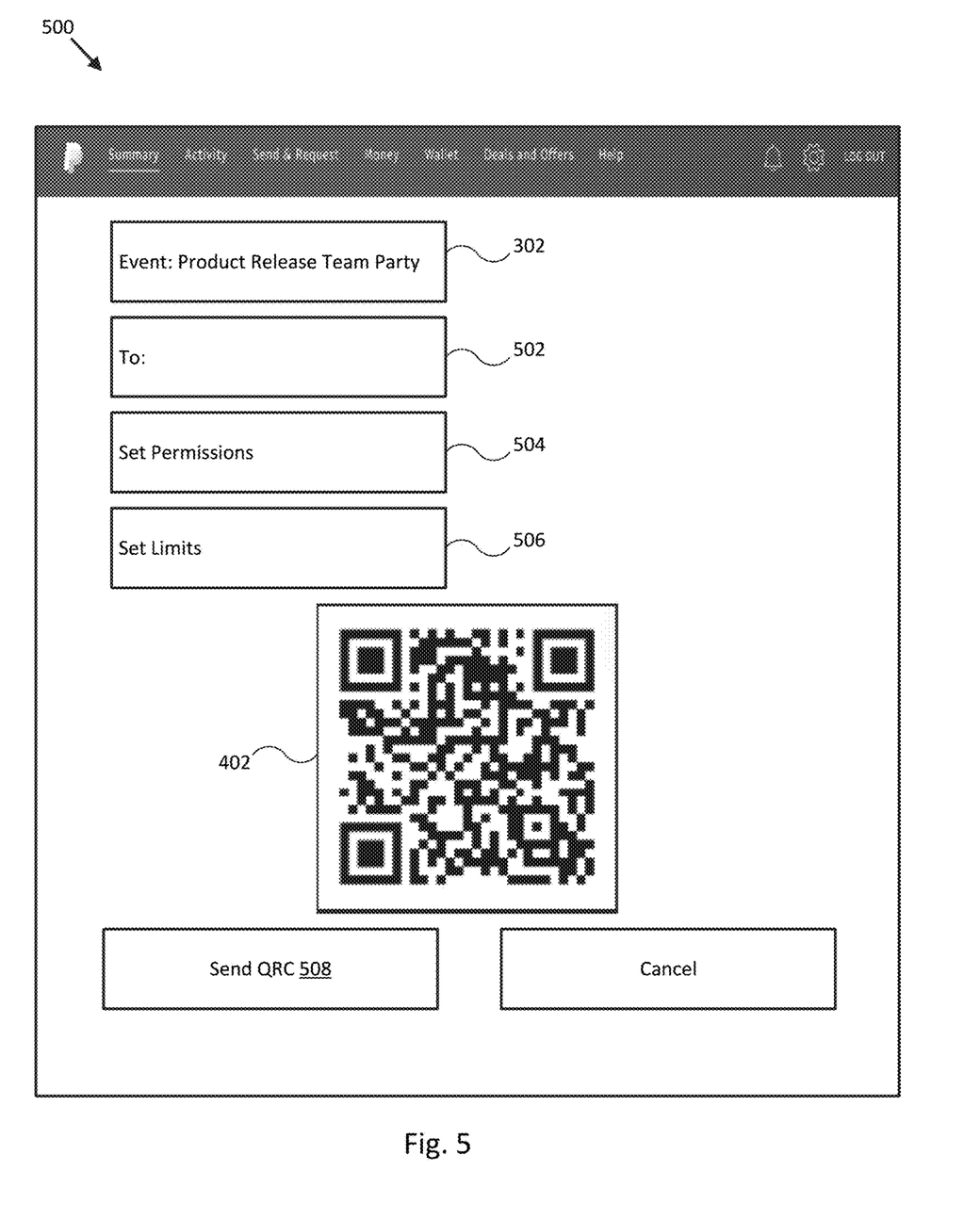

In various embodiments, to share a QR code with additional users, the first user may select the "Share QRC" button/option 404 on the screen 400. Once the first user has selected the "Share QRC" button/option 404, the first user may be presented with a screen 500 for submitting details for sharing a QR code with other users, as shown in FIG. 5. For example, the screen 500 may include a recipient field 502 in which the first user may input one or more recipients for the QR code. In some embodiments, the recipient field 502 may accept a user account, email address, and/or phone number of the recipient. In some cases, the email address and/or the phone number may be used by the system to identify the user account of the recipient if the first user does not know the recipient's user account handle. In some cases, the email address and/or the phone number may be used by the system to create a temporary account for a recipient such that the recipient may still be provided with a QR through their email address or phone number even though the recipient has not yet created a user account.

The screen 500 may further include a permission set option 504, which may be used by the sending/sharing user to establish permissions for a shared QR code. For example, the first user may set a permission for a second user (e.g., a second user device) that receives a second QR code that would allow the second user to further share QR code(s). As another example, the first user may set a permission for a second user that receives the second QR code that limits the second user to a view-only mode in relation to the second QR code such as for display/use in a transaction (e.g., the second user may present the second QR code to a merchant device to conduct a transaction but may not be allowed to share QR codes with other users).

The screen 500 may further include a limit set option 506 that may allow the first user to establish transaction limits for the second user in using the second QR code. For example, the first user may set a limit for the second user who receives the second QR code, such as a limit on a transaction amount that the second QR code can be used for. The transaction amount limit may be for each individual transaction or a total transaction amount limit for all transactions in which the second QR code is used according to some embodiments. In one case, the transaction amount limit may be for the second QR code and any other QR codes that are shared by the second user (e.g., setting a transaction amount limit for one team of a plurality of teams that are organizing an event). Another example limit may be that the second QR code can only be used at certain locations (e.g., within a geofence, perimeter about a geocoordinate, etc.). In another example, the shared QR codes may only be used to conduct transactions at a specific event location. That is, the second user may be limited to using their QR codes while he/she is physically present at the event. In some embodiments, the system may access GPS data for each of the users that have location limitations (e.g., by requesting location data from their user devices) to determine whether they are within the appropriate location for using their QR codes, prior to processing transactions.

As another example, there may be a limit placed on the second QR code for transaction categories and/or transaction amounts. As examples of categories, the second QR code may be limited to one or more categories such as food, beverage, transportation, entertainment, retail shopping, etc. As an example of a transaction amount limit with specific categories, the second QR code may be limited to $50 for food items and $20 for non-alcoholic beverages. Additional limits such as those described in reference to the additional attributes field 308 may be placed on shared QR codes in various embodiments.

As another example, there may be a limit that the second QR code can only be used in a transaction where a third user is using a third QR code. For example, where a parent is the first user and shares the second QR code and the third QR code with his/her children, the parent may limit the second and third QR codes to only being useable when the children are together and are able to both present their shared QR codes. Such a limit may encourage the children to stay together at events. Additionally, such a limit may be implemented to ensure that the children are together when using their QR codes to request rides such as through a rideshare or taxi service, so that a child is not accidentally left behind. For example, a driver may be notified by the system after scanning the second QR code for a first child that the third QR code for a second child must also be scanned for a transaction to be processed by the system.

Once the first user has inputted/selected in the appropriate fields of the screen 500, the first user may select the "Send QRC" button/option 508. Referring back to FIG. 1, subsequently, at block 108, the system may receive a request from the first user device to share the second QR code with the second user device or additional user devices if the first user provides more than one recipient in the screen 500. It is noted that reference is made herein to sharing a QR code in process 100 with another user, such as in a one-by-one fashion; however, it will be appreciated that QR codes may be shared with groups of user devices simultaneously in a similar manner. In such cases, the entire group may be given the same permissions and/or limitations, while in other cases the user that is sharing the QR codes may separately define permissions and limitations for each of the users in the group before sharing the QR codes with the group.

At block 110, the system may generate the second QR code and update the data associated with the first QR code that was generated at block 104. For example, referring again to the example shown in FIG. 7, A1 may be a node that represents the first user and B2 may be a node that represents the second user. B2 may be linked back to A1 in the structure 700. The system may link the second QR code to a second account associated with the second user and further link the second QR code and the second account to B2 in the structure 700. Thus, when the second user uses the second QR code for a transaction, the transaction details may be linked back to the first user's account linked to A1. Similarly, if the second user shares QR codes with other users, represented by nodes C1-C3, the transaction details for transactions conducted by C1-C3 may be linked back to the first user's account linked to A1. Similarly, if the first user shares QR codes with users represented by B1 and B2, the transaction details for transactions conducted by B1 and B2 using their assigned QR codes may be linked back to A1. Therefore, the first user may be able to access, through the first account linked to A1, the transaction details for every transaction that has been conducted by users who have received shared QR codes in the structure 700 allowing for tracking a history of the transactions during an event and monitoring the transactions in real-time. For example, the first user can monitor transactions that occur and track each of the transaction details at a granular level for each user who has received a shared QR code. Therefore, with all of the transactions consolidated for the first user on the first user's account, a detailed transaction report may be generated in and for the first account. In some embodiments, the detailed transaction report may allow the first user to conveniently submit an expense. In some embodiments, the detailed transaction report may include a post-event analysis that may be used for planning future events. In some embodiments, where QR codes are generated for multiple events, the first user may be able to view detailed transaction reports corresponding to each event.

In some embodiments, transactions may have associated rewards that are earned and provided by the service provider. In some cases, rewards earned by children accounts may be propagated up to, and accumulated by, the child's parent account. In some cases, propagation of rewards may continue up each parent account to the original QR code generator account (e.g., the first account associated with node A1 in FIG. 1).

Referring back to FIG. 1, at block 112, the system may send the second QR code to the second user device. The second user may receive the second QR code in the application on the second user device or by email/text message. For example, referring again to FIG. 4, the second user may be able to access the screen 400 in the user interface of the application on the second user device to view the received QR code 402 (e.g., the second QR code) and share a QR code, if the second user was given the view and share permissions.

At block 114, the system may receive a request from the second user device to further share a third QR code with a third user device (or additional user devices). For example, the second user may have selected the "Share QRC" button/option 404 on screen 400 and completed the screen 500 as discussed above.

At block 116, the system may verify that the second user device has a permission to share the third QR code with the third user device (or additional user devices) based on the permissions set by the first user device for the second user device. For example, the system may refer to the structure 700 that stores the permissions for each account that has received a QR code to determine whether the second user device has permission to further share the third QR code with the third user and/or additional users.

If the system determines that the second user does not have permission to further share the third QR code, the system may decline the request from the second user device to share the third QR code. In some embodiments, the application on the second user device may not even display the "Share QRC" button 404 as an option when the second user device does not have the permission to share the third QR code. For example, where the second user only has viewing permission, the second user may be presented with a screen 600 of FIG. 6 in the user interface of the application.

If the system determines that the second user has permission to share the third QR code, at block 118, the system may generate the third QR code for the third user and update the data associated with the first QR code to indicate a sharing of the third QR code by the second user device with the third user device. For example, C2 in structure 700 of FIG. 7 may be created and correspond to an account associated with the third user device (e.g. a third user). C2 may be updated to indicate the permissions and limitations that the third user has in using the third QR code which may be set by the second user in sharing the third QR code. C2 may be linked back to A1 such that all transactions conducted by C2 may be tracked, monitored, and consolidated at the first account corresponding to A1.

Figure 6:
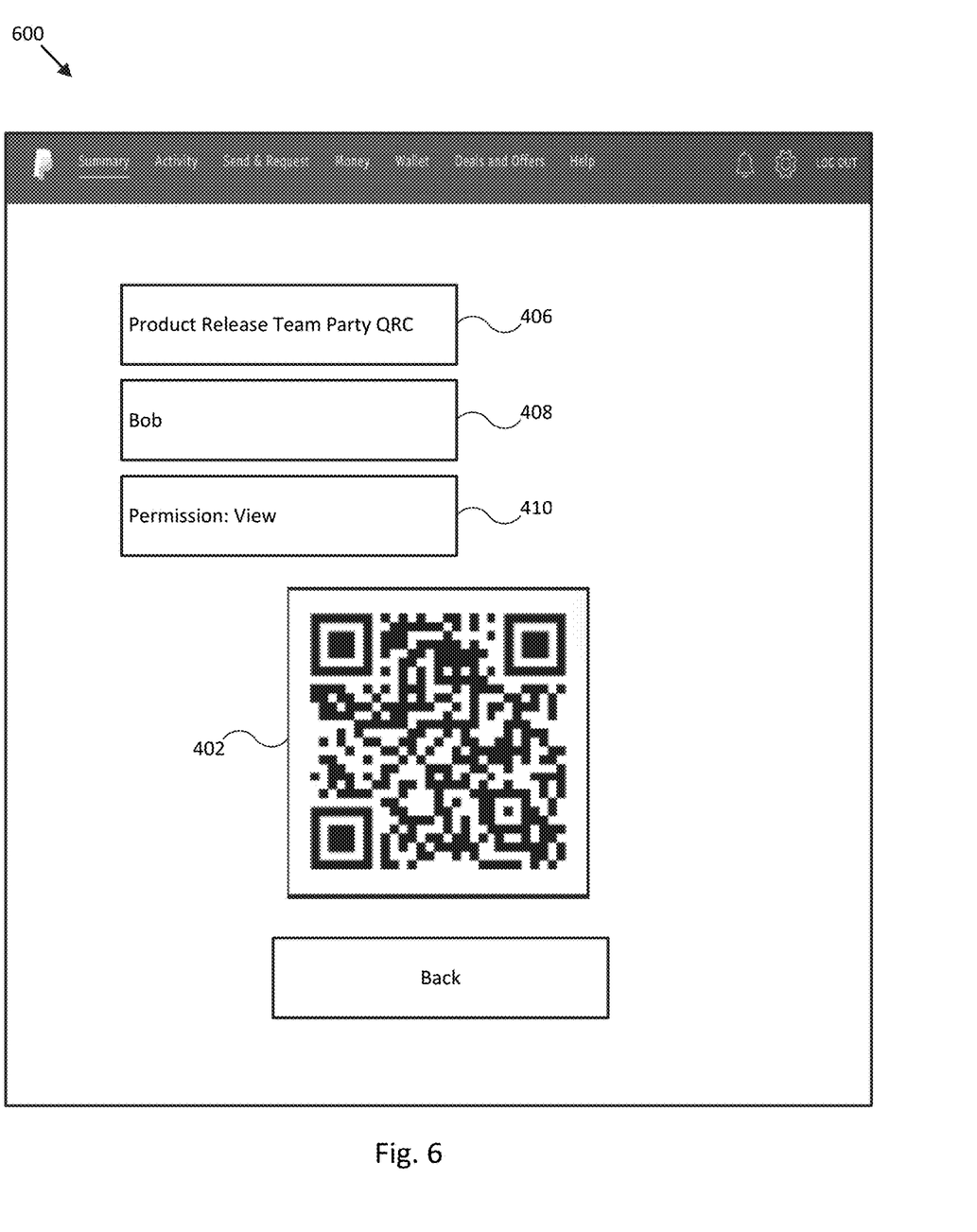

At block 120, the system may send the third QR code to the third user device (e.g., via the network). The third user device may receive the third QR code in the application running on the third user device and/or by email/text message. As an example, the third user may have a share permission and view permission in relation to the third QR code and may be presented with the screen 400 when viewing the received QR code 402 (e.g., the third QR code). As another example, the second user may have provided the third user with a view-only permission of the third QR code which allows the third user to use the third QR code for transactions but prevents the third user from further sharing a QR code with other users. The third user, if only provided viewing permission, may be able to view screen 600 which may include the QR code 402.

In some embodiments, the system may receive a transaction request from a merchant device to process a transaction using a QR code that has been sent to a user by the system (e.g., the first user, second user, third user, etc.). For example, the merchant device may correspond to a point-of-sale for a merchant that is participating in, or otherwise part of, an event organized by an event organizer. In response to the received transaction request, the system may verify that the QR code matches a QR code that was distributed as part of the event. For example, the system may verify that the QR code matches a QR code distributed as part of the event by referencing the structure 700 of FIG. 7 and determining which user (e.g., user account/device) the QR code received in the transaction request is assigned to. For example, meta information extracted from the QR code may include an identifier that can be matched to an account/node in the structure 700. If the system determines that the QR code is assigned to a user for the event, the system may further verify that the transaction satisfies any limitations that may have been placed on the use of the QR code. If the transaction violates any limitations on the use of the QR code, the system may deny the transaction request and send a notification to the merchant device indicating the denial of the transaction request and that the transaction violates one or more limitations on the QR code. On the other hand, if the transaction does not violate any limitations on the QR code, the system may update the first account corresponding to the first user that originally generated the first QR code for the event to show that the QR code in the transaction request has been used. The system may include the details of the transaction with the merchant as part of the transaction history for the event as discussed herein. For example, the transaction amount, item descriptions, location, timestamp, the QR code user, merchant name, merchant location, merchant ID, transaction ID, transaction type code, and so forth may be included in the transaction details. The system may then process the transaction for the merchant device (e.g., credit a payee account (e.g., merchant account), debit a payor account (e.g., first user account), and indicate a successful transaction to the merchant device).

In various embodiments, messages/information may be passed between users that have received QR codes for an event. For example, the system may receive a message from the first user's device intended for the second user's device and/or other user devices. The system may determine, based on referencing the structure 700, the second user device and/or other user devices have received QR codes and may send the message to the second user device and/or other user devices. Messages may be helpful in cases where teams are organizing an event. For example, a first team leader of a first team may send a message to his/her team members whom he/she has shared QR codes to coordinate the event without disrupting or distracting other teams that are also organizing the event.

Figure 8:
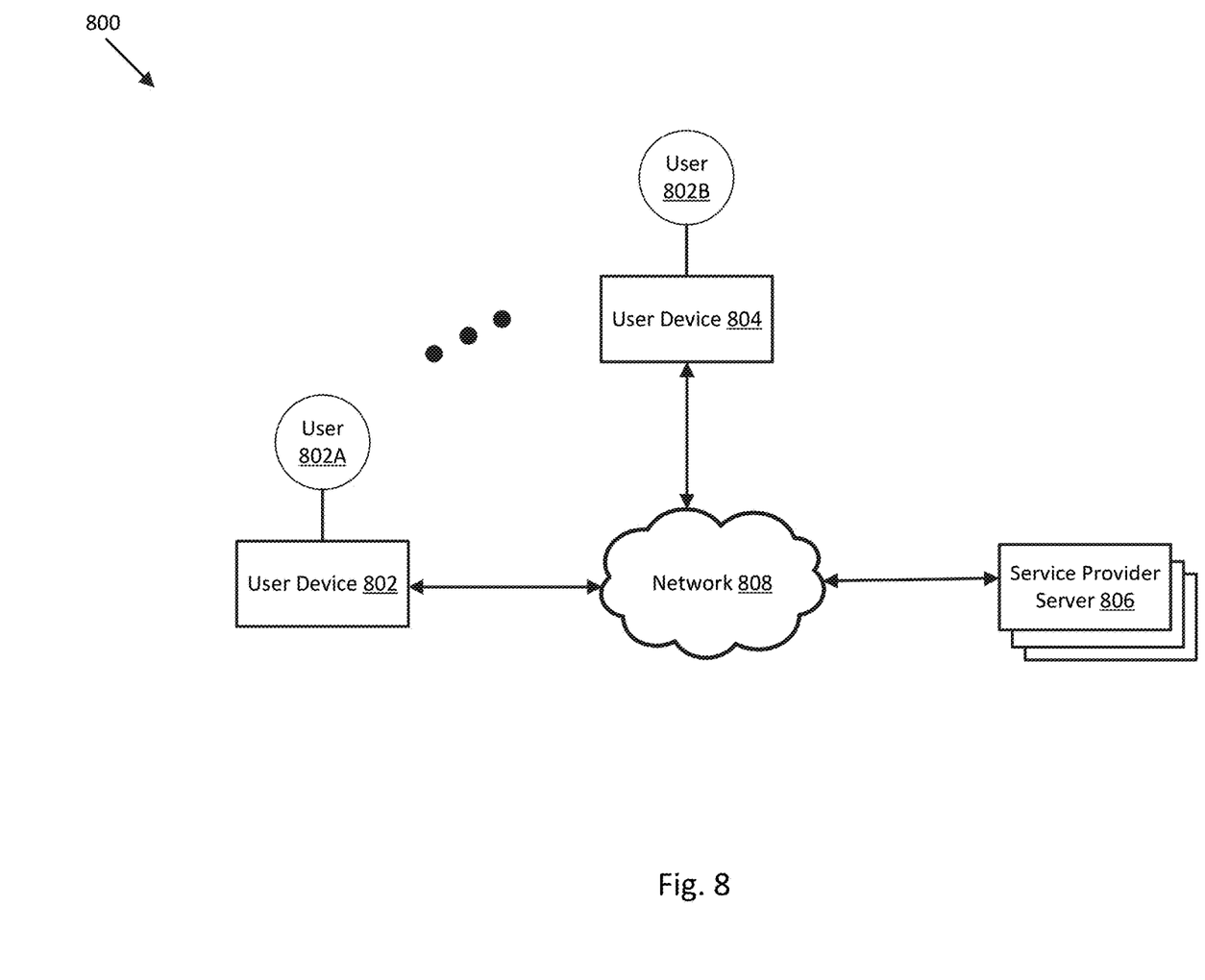
FIG. 8 illustrates a block diagram of a networked system suitable for implementing one or more embodiments of the present disclosure.

Referring now to FIG. 8, a block diagram of a networked system 800 configured to facilitate transaction tracking, monitoring, and consolidation in accordance with one or more embodiments of the present disclosure is illustrated. System 800 includes a user device 802, a user device 804, and a peer-to-peer service provider server(s) 806. A user 802A is associated with user device 802, where user 802A can provide an input to service provider server 806 using user device 802. A user 802B is associated with user device 804, where user 802B can provide an input to service provider server 806 using user device 802B. User 802A and user 802B may use QR codes in accordance with embodiments of the present disclosure.

User device 802, user device 804, and service provider server 806 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 800, and/or accessible over a network 808. Each of the memories may be non-transitory memory. Network 808 may be implemented as a single network or a combination of multiple networks. For example, in various embodiments, network 808 may include the Internet or one or more intranets, landline networks, and/or other appropriate types of networks.

User device 802 may be implemented using any appropriate hardware and software configured for wired and/or wireless communication over network 808. For example, in some embodiments, user device 802 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 802 may include one or more browser applications which may be used, for example, to provide a convenient interface to facilitate responding to recipient account detail requests over network 808. For example, in one embodiment, the browser application may be implemented as a web browser configured to view information available over the internet and respond to requests sent by service provider server 806. User device 802 may also include one or more toolbar applications which may be used, for example, to provide client-side processing for performing desired tasks in response to operations selected by user 802A. In one embodiment, the toolbar application may display a user interface in connection with the browser application.

User device 802 may further include other applications as may be desired in particular embodiments to provide desired features to user device 802. For example, the other applications may include an application to interface between service provider server 806 and the network 808, security applications for implementing client-side security features, programming client applications for interfacing with appropriate application programming interfaces (APIs) over network 808, or other types of applications. In some cases, the APIs may correspond to service provider server 806. The applications may also include email, texting, voice, and instant messaging applications that allow user 802A to send and receive emails, calls, and texts through network 808, as well as applications that enable the user to communicate to service provider server 806 as discussed above. User device 802 includes one or more device identifiers which may be implemented, for example, as operating system registry entries, cookies associated with the browser application, identifiers associated with hardware of user device 802, or other appropriate identifiers, such as those used for user, payment, device, location, and or time authentication. In some embodiments, a device identifier may be used by service provider server 806 to associate user 802A with a particular account maintained by the service provider server 806. A communications application with associated interfaces facilitates communication between user device 802 and other components within system 800. User device 804 may be similar to user device 802.

Service provider server 806 may be maintained, for example, by an online service provider which may provide peer-to-peer transaction services. In this regard, service provider server 806 includes one or more peer-to-peer applications which may be configured to interact with user device 802 and user device 804 over network 808 to facilitate the peer-to-peer transaction services, including transaction detail error reduction as discussed in the present disclosure. Service provider server 806 maintains a plurality of user accounts (e.g., stored in a user account database accessible by service provider server 806), each of which may include account information associated with individual users. Service provider server 806 may communicate over network 808 with a payment network and/or other network servers capable a transferring funds between financial institutions and other third-party providers to complete transaction requests and process transactions as discussed herein.

Figure 9:
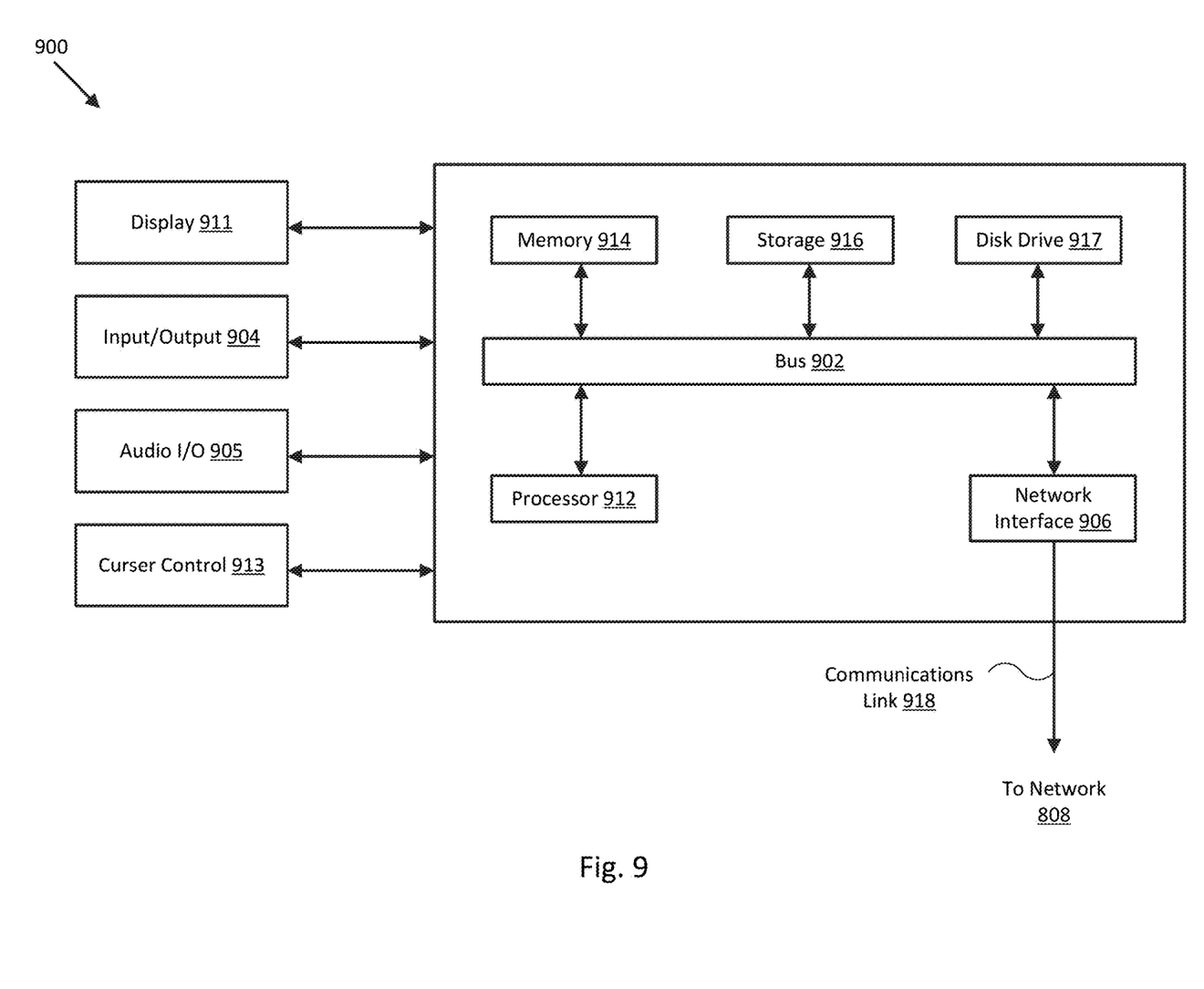
FIG. 9 illustrates a block diagram of a computer system in accordance with one or more embodiments of the present disclosure.

FIG. 9 illustrates a block diagram of a computer system 900 suitable for implementing one or more embodiments of the present disclosure. In various implementations, a user device may comprise a personal computing device (e.g., a personal computer, laptop, smart phone, PDA, Bluetooth device, key FOB, badge, etc.) capable of communicating with the network. It should be appreciated that each of the devices utilized by users, entities, and service providers, and payment networks discussed herein may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). I/O component 904 may further include NFC communication capabilities. An optional audio I/O component 905 may also be included to allow a user to use voice for inputting information by converting audio signals. Audio I/O component 905 may allow the user to hear audio. A transceiver or network interface 906 transmits and receives signals between computer system 900 and other devices, such as another user device, an entity server, and/or a provider server via network 808. In one embodiment, the transmission is wireless, although other transmission mediums and methods may also be suitable. Processor 912, which may be one or more hardware processors, can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer-readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
receiving, from a first user device via a network, a first request to generate a first quick response (QR) code associated with a first account, wherein the first request includes attributes selected by a first user for one or more QR codes generatable based on the first QR code;
generating the first QR code and associated data that represents the attributes;
sending, via the network, the first QR code to the first user device, wherein a provision of the first QR code allows the first user device to share the one or more QR codes with one or more other user devices for use in a transaction;
receiving, from the first user device via the network, a second request to share a second QR code with a second user device, wherein the second request includes permissions defined by the first user for the second user device in using the second QR code, and wherein the permissions include a first permission to share the second QR code with one or more user devices for use in transactions during an event;
generating the second QR code;
updating the data to indicate a sharing of the second QR code with the second user device and the permissions for the second user device in using the second QR code; and
sending, via the network, the second QR code to the second user device.

2. The system of claim 1, wherein the operations further comprise:
receiving, via the network, a third request from a merchant device to process a transaction using the second QR code;
updating the first account corresponding to the first user to log a usage of the second QR code by a second user associated with the second user device and transaction data associated with the transaction with a merchant corresponding to the merchant device; and
processing the transaction for the merchant device.

3. The system of claim 1, wherein the operations further comprise:
receiving, from the second user device via the network, a third request to share the second QR code with a third user device based on the permissions;
updating the data to indicate a sharing of the second QR code from the second user device to the third user device; and
sending, via the network, the second QR code to the third user device.

4. The system of claim 1, wherein the attributes include a location in which the second QR code is usable, a time period during which the second QR code is usable, and a total transaction amount limit for transactions conducted using the second QR code.

5. The system of claim 1, wherein the operations further comprise:
receiving, via the network, a message from the first user device in association with the second QR code;
determining, based on the data, the at least that the second QR code has been shared with the second user device; and
sending the message to the second user device.

6. The system of claim 1, wherein the operations further comprise:
updating a transaction history of the first account to indicate transaction data associated with one or more transactions conducted by the second user device using the second QR code.

7. The system of claim 1, wherein the data comprises a hierarchical parent-child structure that indicates the first account as a parent account and a second account associated with the second user device as a child account to the first account.

8. The system of claim 1, wherein the second request includes a limit defined by the first user for the second user device in using the second QR code, and wherein the limit requires the second QR code to be presented with a third QR code shared with a third user device when conducting a transaction.

9. A method comprising:
receiving, by a computer system from a first user device via a network, a request to share a first quick response (QR) code with a second user device, wherein the request includes a permission for the second user device to share the first QR code with one or more user devices for use in transactions during an event;
verifying that the first user device is permitted to share the first QR code with the second user device based on attributes established for the first user device when a second QR code was shared with the first user device;
in response to verifying that the first user device is permitted to share the first QR code with the second user device, updating, by the computer system, data associated with the second QR code to indicate a sharing of the first QR code with the second user device and the permission for the second user device in using the first QR code; and
sending, by the computer system via the network, the first QR code to the second user device.

10. The method of claim 9, further comprising:
receiving, via the network, a second request from a merchant device to process a transaction using the first QR code;
updating a first account corresponding to the first user device based on transaction data associated with the transaction; and
processing the transaction for the merchant device.

11. The method of claim 9, further comprising:
receiving, from the second user device via the network, a second request to share the first QR code with a third user device based on the permission;
updating the data to indicate a sharing of the first QR code from the second user device to the third user device; and
sending, via the network, the first QR code to the third user device.

12. The method of claim 11, wherein the updating the data comprises changing a hierarchical parent-child structure to indicate a first account corresponding to the first user device as a parent account and a second account corresponding to the second user device and a third account corresponding to the third user device as child accounts to the first account.

13. The method of claim 9, further comprising
receiving, via the network, a message from the first user device in association with the first QR code;
determining, based on the updated data, that the first QR code has been shared with the second user device; and
sending the message to the second user device.

14. A non-transitory machine-readable medium having stored thereon machine-readable instructions executable to cause a machine to perform operations comprising:
receiving, from a first user device via a network, a request to share a first machine-readable code with a second user device, wherein the request includes a permission for the second user device to share the first machine-readable code with one or more user devices for use in transactions during an event;
confirming that the first user device is permitted to share the first machine-readable code with the second user device based on attributes established for the first user device when a second machine-readable code was shared with the first user device;
updating data associated with the second machine-readable code to indicate a sharing of the first machine-readable code with the second user device and the permission for the second user device in using the first machine-readable code; and
sending, via the network, the first machine-readable code to the second user device.

15. The non-transitory machine-readable medium of claim 14, wherein the operations further comprise:
receiving, via the network, a second request from a merchant device to process a transaction using the first machine-readable code;
updating a first account corresponding to the first user device based on transaction data associated with the transaction; and
processing the transaction for the merchant device.

16. The non-transitory machine-readable medium of claim 15, wherein the first machine-readable code is limited for use at a predetermined location and during a predetermined time period, and wherein the operations further comprise confirming that the transaction is conducted at predetermined location and during the predetermined time period.

17. The non-transitory machine-readable medium of claim 14, wherein the operations further comprise:
receiving, from the second user device via the network, a second request to share the first machine-readable code with a third user device based on the permission;
updating the data to indicate a sharing of the first machine-readable code from the second user device to the third user device; and
sending, via the network, the first machine-readable code to the third user device.

18. The non-transitory machine-readable medium of claim 14, wherein the operations further comprise:
receiving, from the first user device via the network, a third request to disallow further sharing of the first machine-readable code by the second user device; and
removing the permission associated with the first machine-readable code.

19. The non-transitory machine-readable medium of claim 14, wherein the attributes specify a location in which the first machine-readable code is usable, a time period during which the first machine-readable code is usable, and a total transaction amount limit for transactions conducted using the first machine-readable code.

20. The non-transitory machine-readable medium of claim 14, wherein the operations further comprise:
receiving, via the network, a message from the first user device in association with the first machine-readable code;
determining, based on the updated data, that the first machine-readable code has been shared with the second user device; and
sending the message to the second user device.

* * * * *

UNITED STATES PATENT AND TRADEMARK OFFICE
CERTIFICATE OF CORRECTION

| | | |
|---|---|---|
| PATENT NO. | : 11,562,191 B1 | |
| APPLICATION NO. | : 17/386394 | |
| DATED | : January 24, 2023 | |
| INVENTOR(S) | : Sunil Kishor Pathak et al. | |

It is certified that error appears in the above-identified patent and that said Letters Patent is hereby corrected as shown below:

In the Claims

Claim 5, Column 14, Line 50, change "determining, based on the data, the at least that the second" to --determining, based on the data, that the second--.

Signed and Sealed this
Seventh Day of March, 2023

Katherine Kelly Vidal
*Director of the United States Patent and Trademark Office*